L. ROACH.
Rotary Cultivator.
No. 19,652.
Patented Mar. 16, 1858.
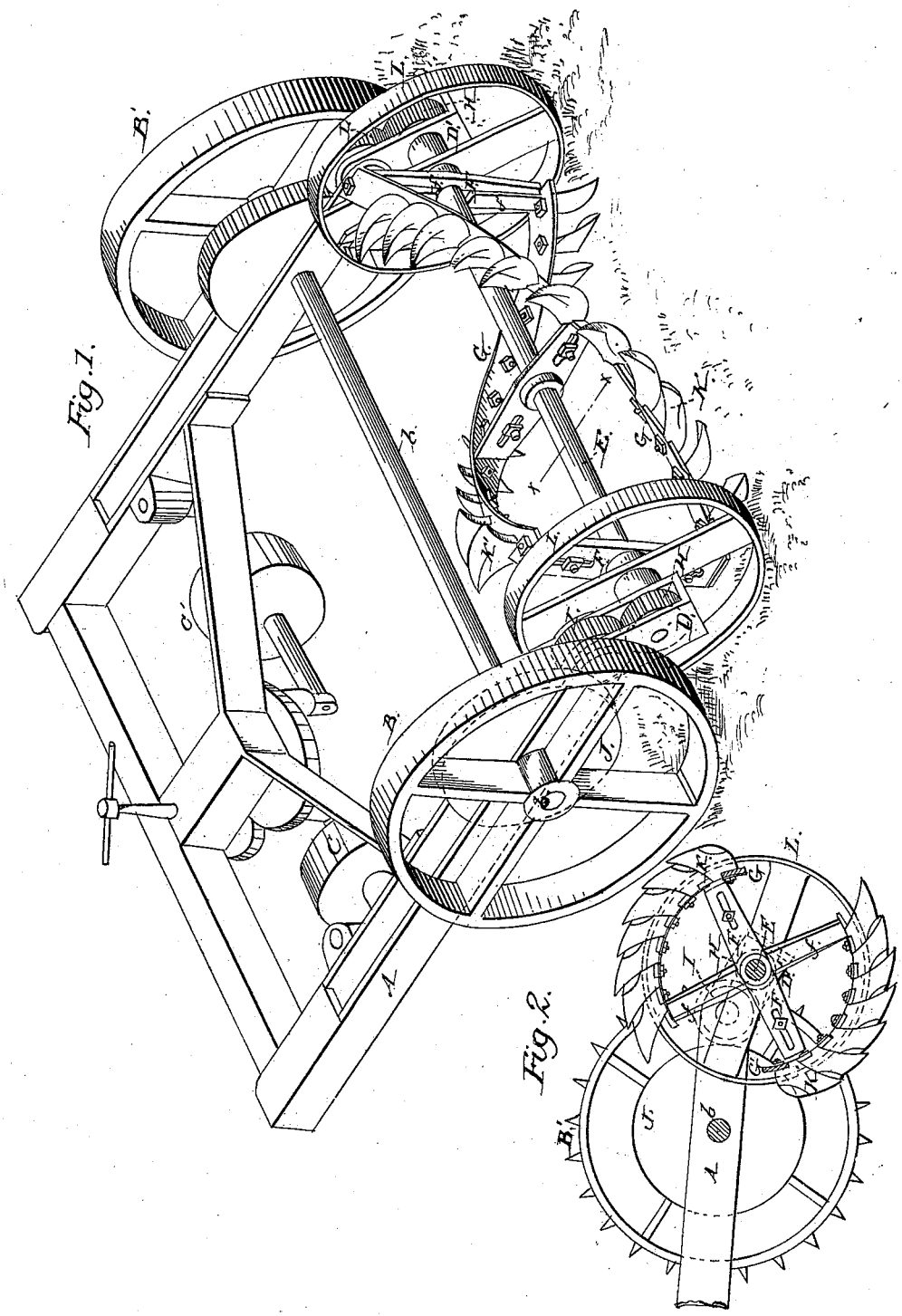

UNITED STATES PATENT OFFICE.

LEWIS ROACH, OF COVINGTON, KENTUCKY.

IMPROVEMENT IN GANG-PLOWS.

Specification forming part of Letters Patent No. 19,652, dated March 16, 1858.

*To all whom it may concern:*

Be it known that I, LEWIS ROACH, of Covington, Kenton county, Kentucky, have invented a new and useful Improvement in Gang-Plows; and I hereby declare the following to be a full and exact description of the same, reference being had to the accompanying drawings, making part of this specification.

My invention consists in the arrangement of a gravitating and rotating frame, to which the plows are attached in one or more spiral gangs.

In the accompanying drawings, Figure 1 represents the implement in perspective as viewed from the rear. Fig. 2 is a vertical longitudinal section of the rear part, taken at the line x x, Fig. 1.

A is the frame or bed of the implement.

B B' are ground-wheels, connected and rotating in conjunction with the axle b.

E is the rotating plow-shaft, journaled in swinging stirrups D D', the hinge attachments of which to the frame A form also the axes of rotation of carrier-wheels I, which gear with cog-wheels J on the axle b, and also with pinions H on the plow-shaft E.

L L are wheels running loosely on the plow-shaft E, and supporting it at the required distance from the ground.

The plows K K' are bolted to splines G G, of the represented spiral form, which are attached to arms F f on the shaft E, the portion f having a sliding adjustment to regulate the depth of plowing.

C C' are rudder-wheels, which may be operated by any customary means.

The operation is as follows: The sliding arms f being so adjusted as to give to the plows K K' a radial extension beyond that of the wheels L, equivalent to the desired depth of plowing, the machine is put in motion, the gearing H I J causing the plows to revolve in the same direction as the ground-wheels B B', by which means they are successively driven into the ground. The wheels L are kept upon the ground by the weight of the parts depending on them, and accommodate the plows to any inequalities in the ground, the arrangement of the stirrups D D' causing the gearing to operate with equal effect in any position.

It will be observed that each plow enters the ground somewhat in advance of the furrow made by the opposite plow of the preceding gang. The relative sizes of the cog-wheels J and pinions H therefore must be such that as the machine advances the plows will be impelled backward through the ground with sufficient rapidity to leave no unplowed intervals.

The implement may be impelled by either steam or animal power. Where steam is the motor connection may be made directly with either shaft b or E, as preferred.

I claim as new and of my invention—

The described arrangement of spiral splines G, to which the plows are attached, and adjustable arms F f, in combination with the gravitating shaft E and gage-wheels L.

In testimony of which invention I hereunto set my hand.

LEWIS ROACH.

Witnesses:
GEO. H. KNIGHT,
ANDW. J. HUSTON.